Nov. 12, 1968     H. HOFMANN     3,410,410
FILTER SCREENS AND FILTERING PROCESSES
Filed March 30, 1964     4 Sheets-Sheet 1

INVENTOR
HASSO HOFMANN

BY Sughrue, Rothwell, Mion,
Zinn & Macpeak
ATTORNEYS

INVENTOR
HASSO HOFMANN

BY Sughrue, Rothwell, Mion, Zinn & Macpeak
ATTORNEYS

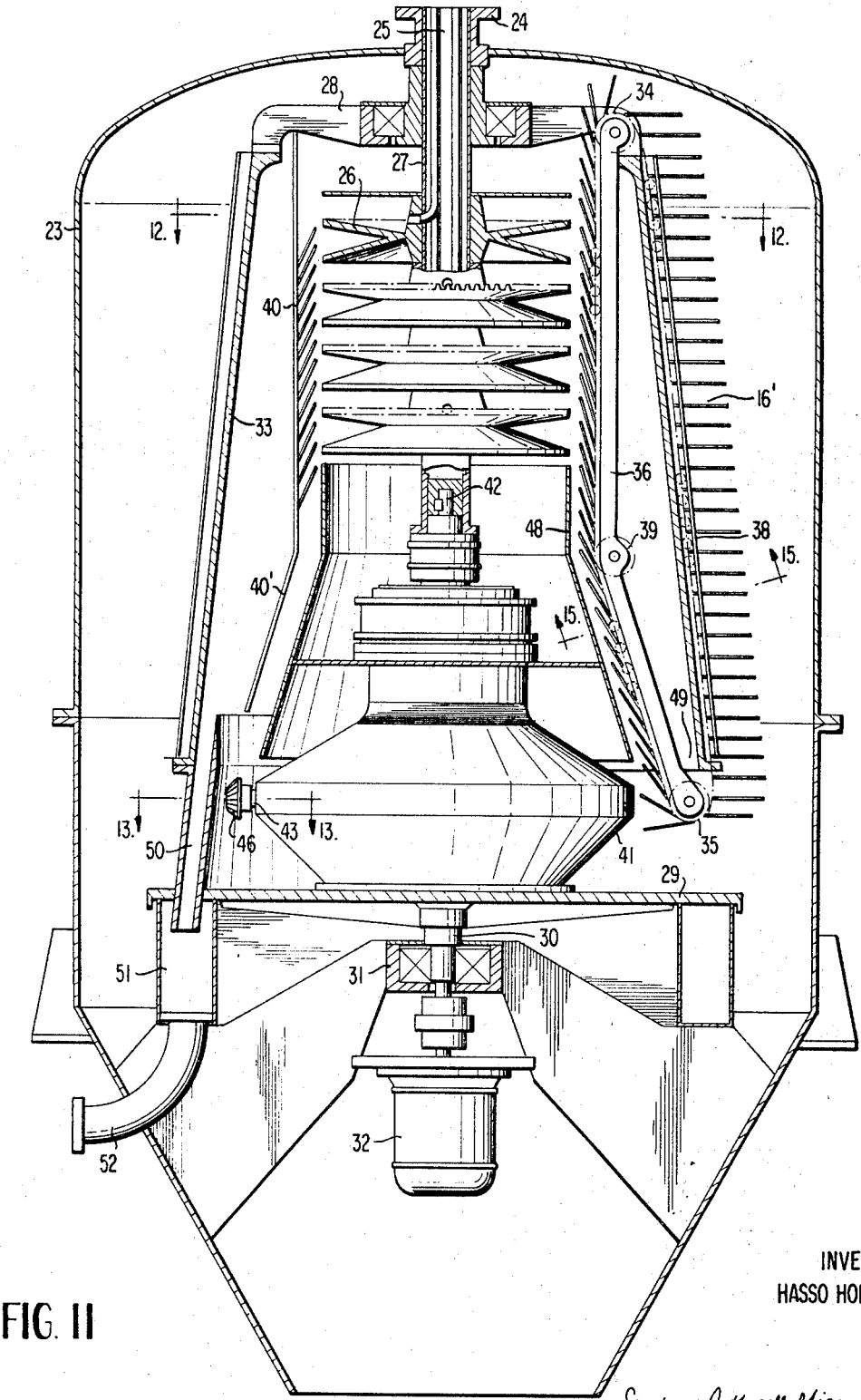
FIG. II
INVENTOR
HASSO HOFMANN

Nov. 12, 1968  H. HOFMANN  3,410,410

FILTER SCREENS AND FILTERING PROCESSES

Filed March 30, 1964  4 Sheets-Sheet 4

INVENTOR
HASSO HOFMANN

BY Sughrue, Rothwell, Mion,
Zinn & Macpeak
ATTORNEYS

United States Patent Office 3,410,410
Patented Nov. 12, 1968

3,410,410
FILTER SCREENS AND FILTERING PROCESSES
Hasso Hofmann, 7014 Kornwestheim, Lenzhalde 43, Hamburg, Germany
Filed Mar. 30, 1964, Ser. No. 356,694
Claims priority, application Germany, Apr. 2, 1963,
H 48,727
8 Claims. (Cl. 210—78)

ABSTRACT OF THE DISCLOSURE

A filter is formed by a plurality of overlap layers of strip brushes having channel shaped bristle holders pivotally attached to a moving belt or chain for cleaning. The pivotal movement may occur as the belt or chain makes a sharp turn and the filtered material is flung from the brushes. A plurality of vertically moving curved brush carriers are positioned to form a centrifugal drum filter.

---

Figure 1:
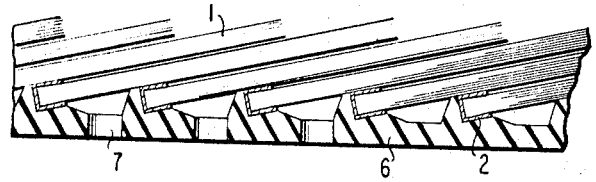

This improvement relates to improvements in filters, and more specifically to a filter screen including a plurality of strip brushes arranged parallel to one another, their bristles overlapping in the fashion of roof tiles, shingles or slates. The liquid or air or gas to be filtered finds its way through the row of bristles and follows a direction of flow which is substantially at right angles with the longitudinal extension of the rows of bristles, while some air or liquid passes through the rows of brushes along their longitudinal extension. In this manner the material to be filtered from the air, gas or liquid is retained between and on the bristles. The greater the overlap between the rows of bristles, the greater is the filtering effect, which is also influenced by the thickness of the bristles and the total thickness of the strip brushes. The bristles, made of metal or plastic material, are waved favourably in order to prevent them from being squeezed together too tightly under high pressure.

The brushes preferably used in my invention are of a known commercial type made in strips, of lengths limited only by the length of the metal strip and wire that can be fed continuously to the automatic machine which forms the strip into a channel and feeds the brush material uniformly under the wire, clamps it into a solid brush strip and trims the ends of the brisles to the desired uniform length and automatically cuts off the strip length required.

Prior art filter screens commonly use filter cloth resting on perforated plates. Such cloth, fabric or gauze has the disadvantage that it is easily clogged, very difficult to clean and has a short service life. Another disadvantage of other known filtering apparatus, such as the one described in the German Patent 292,621 using unidirectional fibres of animal or vegetable origin or metal wires in layers as a filtering material, is that the staggered arrangement of stationary frames or grates fitted with tufts of fibres precludes the filtering effect obtained from later developed filters, such as vacuum filters, filter presses, circulating filters or centrifugal filters, which make use of large surface areas combined within less space. Another known filtering apparatus is described in the German Patent 935,-542, and has bristles attached to a belt or moving surface. Such filtering apparatus has the disadvantage that only a relatively small filter density can be obtained in this manner and that it can be used only for the filtration of liquids.

This invention provides a filter screen for filtering air or water with the aid of strip brushes manufactured automatically and arranged parallel and made to overlap in the fashion of roofing tiles or shingles, distinguished from the tufts of bristles attached to moving surfaces, bands or belts in that the brush strips serve as linkable backings and the densely clamped bristles form continuous rows of parallel-arranged strip brushes, which can be quickly and easily cleaned and have a long service life.

This invention also provides a continuous filtering process by combining such parallel-arranged and shingle-like overlapping strip brushes in a filter screen adapted for continuous operation.

This invention provides filtering means which makes use of centrifugal force not only for an enhanced filtering effect but also to obtain a self-cleaning action of the filtering means, such self-cleaning action being also obtainable by mechanical control or by a combination of centrifugal force and mechanical control.

This invention provides a substantially higher filtering efficiency in a continuously operating filter screen by combining maximum filter surface areas efficiently within a confined space.

This invention includes a filter screen preferably fitted with strip brushes having bristles of suitable individual length, individual thickness and resultant total brush thickness, and is made from specially chosen material for the continuous filtering of dust-laden air or sooty gases, such as flue gases.

In one embodiment of the many variants of the filter screen, the strip brushes are arranged in shingle-like overlapped fashion and move continuously during the actual filtering process while they are rotated at the same time in the continuous high-efficiency filtering of waste waters containing solid or sludge-like impurities as may be encountered in sewage water.

One of the advantages provided by the present invention is that the strip brushes are easy to clean. For this purpose the filter screen as formed by the overlapped rows of strip brushes need only be exposed to compressed air introduced from the filtrate side to remove dry residue or deposits, as such residue or deposits drop off from the bristles when the bristles are shaken up by an air current. Instead of compressed air it is possible to use pressurized water to flush any hard or sludgy deposits from the bristles, and in embodiments where centrifugal force is used a self-cleaning effect is obtained.

Thus, it will be understood that the strips of shingled brushes of this invention can be mounted on a frame, a grate or a perforated plate in the manner of conventional filter designs using internal suction or external pressure or operated merely by gravity feed and taking the form of chamber filters or frame filters.

Similarly, the metal strips or channels forming the backing of the strip brushes as described above can be mounted on a permeable, porous or perforated endless belt or can be fastened to an endless chain, the continuous filtering is thus obtained by the parallel arrangement and shingle-like overlapping of the strip brushes. The bristle-type filter screens obtained in this manner can be used in the place of prior art filter cloth which is moved continuously and passes alternately through a filtering zone and a cleaning zone. A special and novel characteristic of my invention is that when the endless belt or chain fitted with strip brushes turns around a pulley, roller or sprocket wheel of small diameter in the cleaning zone, the bristles, normally overlapping in shingle fashion over the greater part of the belt or chain travel and particularly while passing through the filtering zone, are made to stand up from the belt, or chain.

This rising of the strips or channels and the resultant upstanding or unlapping of the rows of bristles while passing through the cleaning zone is caused by the sharp bend around the roller, pulley or sprocket wheel. In this upstanding position the brushes are easy to clean, and owing to this feature self-cleaning action is obtained by the use of centrifugal force where filter screens formed of strip brushes capable of overlapping and unlapping as described are used in rotary filter drums or centrifugal filters.

For this purpose the brush backings which are strips or channels of metal or other suitable material, are linked or pivoted or hinged to the belt or chain so that the strip brushes, when passing the cleaning zone, can stand up from their shingle-like overlapped position.

The best mode contemplated of carrying out my invention for continuous filtering is to use such bristle-type filter screens in a rotating drum filter in such a manner that the circulating belts or chains studded with strip brushes as described above are arranged along the inner circumference of the drum and that the overlapping brushes while moving on the inner portion of the chain or belt travel form the actual filtering screen within the drum. While the filtrate passing through the overlapped strip brushes during their inner portion of the belt or chain travel is intercepted by a baffle or other suitable means arranged behind the filter screen formed by the overlapped brushes and flows off into suitable drains, the continuously rotating brush-studded belts or chains carry the solid or sludgy material deposited on the filter surface formed by the overlapped brushes toward the discharge end of the drum where the brush-studded chains are reversed in their continuous circulating movement and where the strip brushes arise from their shingle-like overlapped position, thereby causing the deposits to drop off from the strip brushes. Any remaining deposits are forced off from the brushes and from among the bristles when the brushes pass through the return portion of their travel, during which the brushes stand out radially from the belts or chains owing to centrifugal force.

In the drawings I have shown my invention embodied in a filter screen including overlapping strip brushes used to replace conventional filter materials and used in a novel method of continuous filtering and continuous self-cleaning and by referring to the numerals used in the several views of the drawings I shall give a detailed description of my invention and various embodiments which may be further modified and adapted without, however, deviating from the spirit or nature of my invention.

Figure 2:
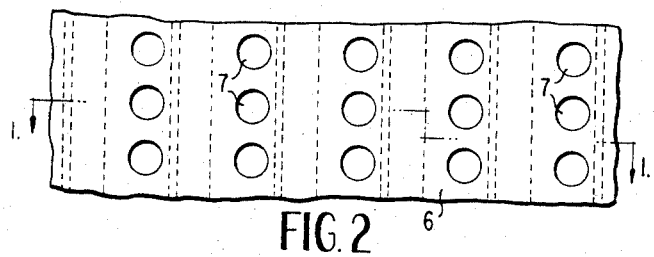
Figure 3:
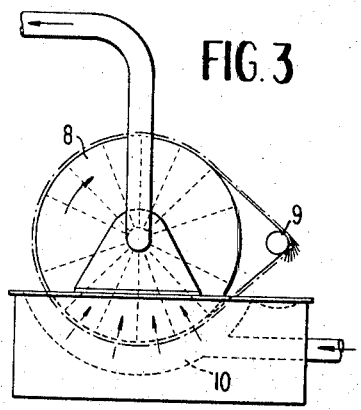
Figure 4:
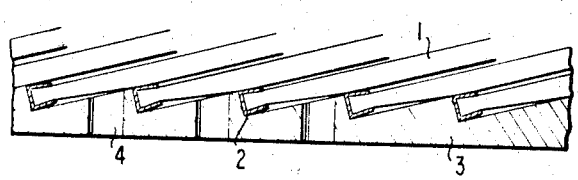
Figure 5:
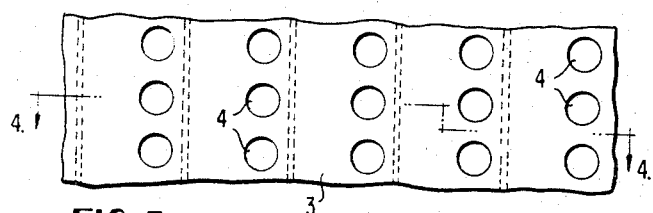
Figure 6:
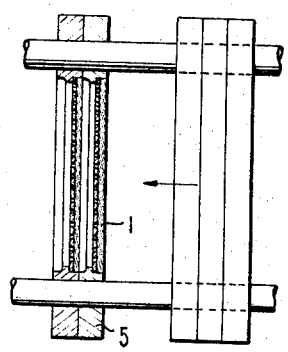
Figure 7:
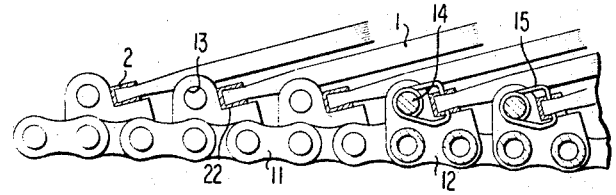
Figure 8:
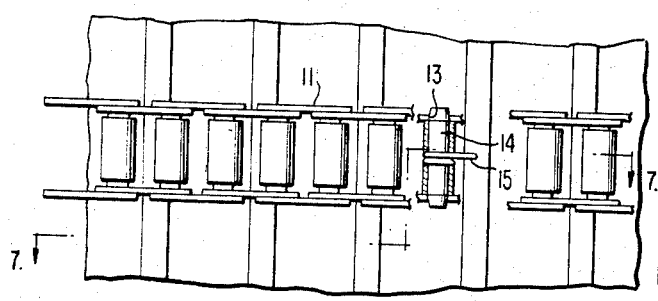
Figure 9:
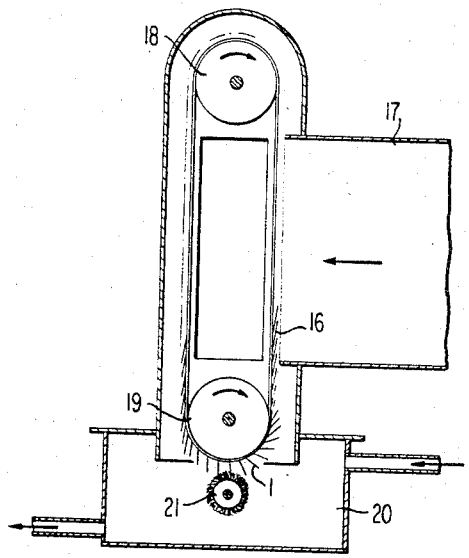
Figure 10:
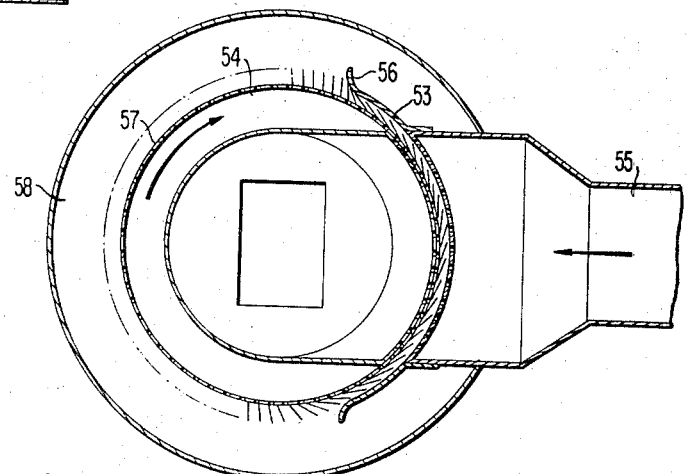
Figure 12:
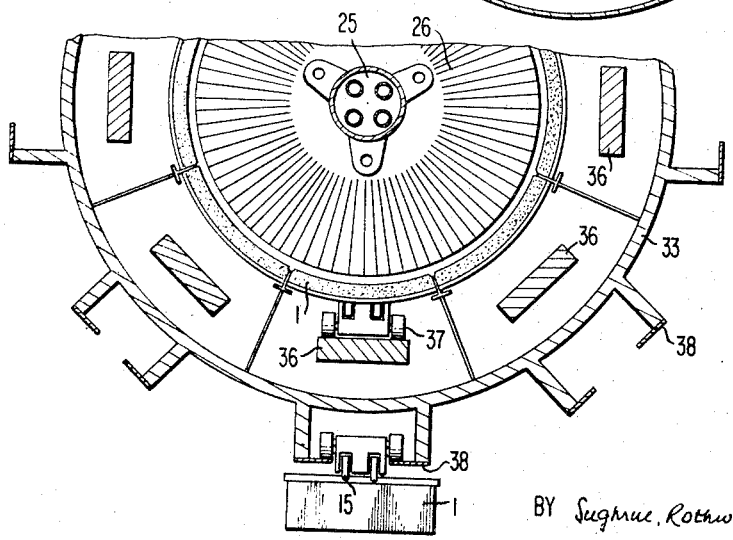
Figure 13:
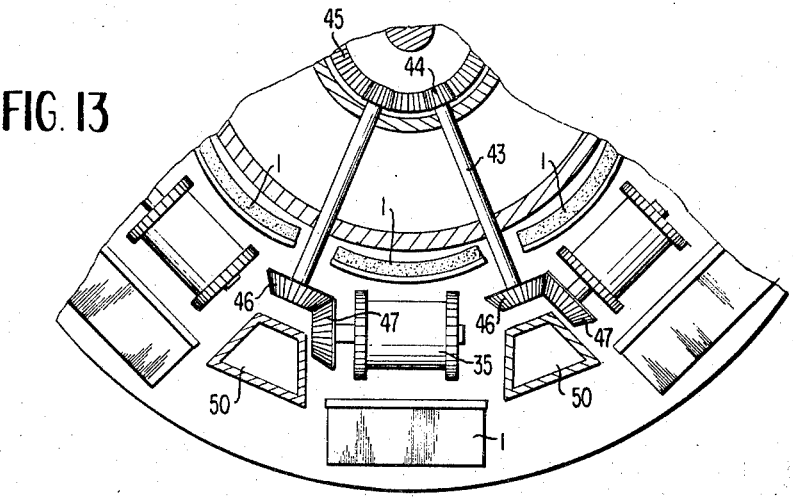
Figure 14:
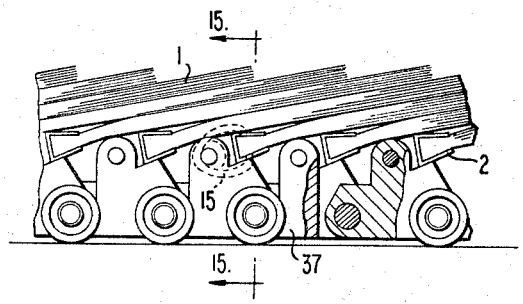
Figure 15:
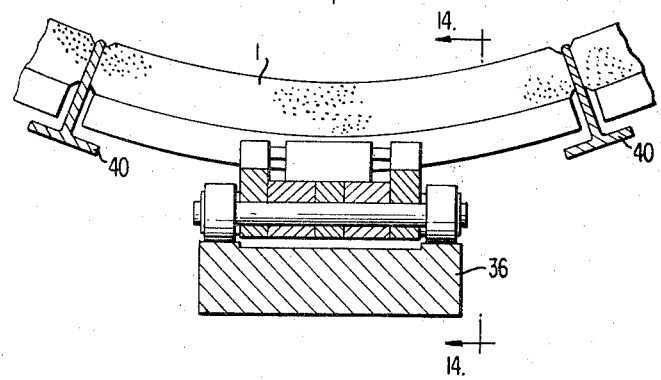
Figure 16:
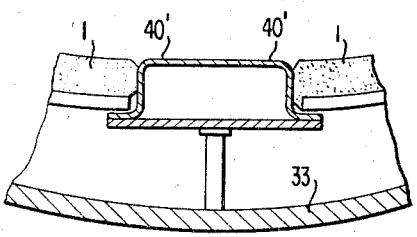

In the drawings:

FIG. 1 is a longitudinal sectional elevation of a filter screen consisting of an elastic belt studded with strip brushes, FIG. 2 is a plan view of FIG. 1, but omitting the bristles, FIG. 3 diagrammatically shows a drum-type vacuum filter equipped with a filter-screen belt as shown in FIG. 1, FIG. 4 is a sectional elevation of a filter screen consisting of a perforated plate studded with strip brushes, FIG. 5 is a plan view of FIG. 4, but omitting the bristles, FIG. 6 diagrammatically shows the frame of a frame-type filter press equipped with filter plates as shown in FIG. 4, FIG. 7 shows a filter screen consisting of strip brushes linked to a chain, FIG. 8 is a plan view of FIG. 7, but omitting to show the bristles, FIG. 9 is a sectional elevation view of a continuously circulating filter, FIG. 10 is a sectional eelvtaion view of a drum-type rotary filter for the filtering of particle-laden air or gases, FIG. 11 is a sectional elevation view taken through a drum-type rotary filter for the filtering of particle-laden liquids, FIG. 12 is a section along the line 11—11 in FIG. 11.
FIG. 13 is a section along the line 12—12 in FIG. 11.
FIG. 14 is a section along the line 13—13 in FIG. 15.
FIG. 15 is a section along the line 14—14 in FIG. 14.
FIG. 16 is a section along the line 15—15 in FIG. 11.

My invention in its broadest aspects relates to a filter screen comprising bristles held in strips or channels of metal or other suitable material and arranged in a manner described herein at greater length which I have found to render a substantially better filtering efficiency than hitherto obtained by prior art designs. Referring more in detail to the figures of the drawings, the essential feature of my invention includes strip brushes 1 which have thin-layered bristles. Strips 2, holding rows of bristles and forming the backs of the brushes, consist of a channel-like rail wherein the layer of bristles is clamped fast. The strips 2 are mounted on a frame or a perforated plate 3 in such a manner that the layers of bristles formed by the individual strip brushes overlap in the fashion of roofing tiles or shingles, as is shown in FIG. 4. When particle-laden liquid or waste water, such as untreated sewage water, is passed through a filter screen as described herein, the filtrate passes through the overlapping layers of bristles and runs off through holes 4 in the plate 3. The deposits, sediment, residue or solid material are retained on the plurality of layers of bristles. FIG. 4 shows stepped-off gradations on the surface of plate 3 to enable the shingle-like arrangement of the strip brushes 1 in such a manner that the layers of bristles of the strip brushes overlap as closely and as tightly and densely as is commensurate with the desired filtering effect.

A filter screen as shown in FIG. 4 can be used in the form of a filter plate, as shown in FIG. 6, in a frame 5 of a frame-type filter press.

The embodiment shown in FIGS. 1 and 3 also comprises a carrier for the strip brushes 1, but instead of using a perforated plate 3 as a carrier, a perforated elastic belt 6 is provided on whose top side the strips 2 of the brushes 1 are also mounted in a manner causing the rows of bristles to overlap in roofing-tile fashion. The holes 7 in the elastic belt 6 are widened in funnel fashion towards the strip brushes 1 in order to facilitate the flow-off of the filtrate through these holes.

A filter screen as shown in FIG. 1 can be used as a continuous filter belt for a vacuum filter drum as shown in FIG. 3. The endless filter belt runs around a sectionally subdivided cell-type vacuum drum 8 and an idling roller 9. The vacuum drum dips into a tank 10 into which particle-laden liquid, waste water or sewage is introduced. The cells of the rotating vacuum drum 8 dipping into the polluted liquid are under negative pressure during their travel through the tank so that the filtrate is sucked into the inner drum through the layers of strip brushes 1 and deposits are collected on the brushes, such deposits being released from the bristles when the rotary motion of the filter belt is reversed at an acute angle where the belt runs around the idling roller 9, thus causing the layers of bristles to stand widely apart as contrasted to the overlapping position of the rows of bristles. At this point and over the entire travel in upstanding position the bristles can be additionally cleaned by the use of compressed air or a pressurized liquid.

A filter screen as shown in FIG. 1 can also be used as a continuous filter area in a drum-type rotary filter as shown in FIG. 10. An endless filter screen 53 passes around the outside of a rotating drum 54 and is exposed in the filtering zone of duct 55 to dust-laden air or particle-laden gases. Before the strip brushes 1 forming the filter screen 53 enter into the filtering zone they are guided by guide vanes 56 against the perforated wall 57 of the inner drum 54 and thus caused to overlap in rooftile or shingle fashion. The dust or air-borne particles carried by the air or gases forced through the duct 55 are deposited on the strip brushes 1 and are flung off in the range of the free housing 58 by centrifugal force where they impinge upon the wall of the housing 58 and are collected for easy removal by suitable means not shown at the bottom of the housing 58. In this manner the strip brushes pass through a self-cleaning cycle before they re-enter into the filtering zone.

In FIG. 7 the elastic belt shown in FIG. 1 has been replaced by an endlessly rotating chain 11. Evenly distributed over the entire length of this chain, which may take the form of a roller chain or a silent chain, there are side plates 12 which have bushed or unbushed holes 13 to take up round pins 14, which hold spring clamps 15, which in turn hold the strips 2 in which the rows of bristles are held. Several strands of chain can be arranged in parallel, the strip brushes being mounted thereon over an accordingly greater width in the manner just described.

Such brush-studded chains can be used in continuous or circulating filters, as shown in FIG. 9. An endless brush-studded chain 16 runs around sprocket wheels 18 and 19 mounted above and below a flue gas exhaust duct or any gas or air-conducting passage 17 in such a manner that on its downward travel the chain is exposed to the particle-carrying air or gases and the dust, soot or particles are deposited on the rotating strip brushes 1. When the chain moves around the lower sprocket wheel or pair of sprocket wheels 19 the strip brushes 1, which overlapped in shingle fashion while passing through the filter zone, move in their hinges and turn into a suspended, vertical position and are passed through a cleaning bath 20 fitted with a roller brush 21. When the chain moves around the top sprocket wheel or wheels 18 the strip brushes return into their shingle-like overlapping position, which can be maintained in the filtering zone by providing suitable guiding means to effect mechanical control.

As shown in FIG. 7, the side-plates 12 having holes 13 have an extended portion 22 on which the strips 2 forming the backs of the filter brushes are supported in the filtering position which is identical with the overlap position.

In FIGS. 11 through 16 a rotary or centrifugal filter drum or drum-type filter for filtering polluted liquids is shown in which brush-studded chains 16' as embodied in FIG. 14 are used to form the actual continuous filter screen used in my invention for centrifugal filtering in a rotary filter drum. At the top of the central axis of a housing 23 for the centrifugal or rotary drum an inlet 24 is provided for admission of waste water or contaminated liquid to be filtered.

The polluted water or particle-carrying liquid entering through the inlet 24 passes through a tube bundle 25 and is distributed over the individual tubes of this tube bundle and then impinges upon feed disks 26 which are grooved or fluted radially, the radial grooves or flutes slightly rising from the center of these disks toward their outer rims. These feed disks 26 rotate around a fixed hollow journal 27 around which a spider 28 carrying the rotating unit of the centrifuge is mounted in a bearing. The bottom end of the rotating unit takes the form of a base plate 29, while a downward projecting central trunnion 30 is mounted to run in a ball bearing 31 which is firmly connected with the wall of the housing 23, the trunnion being coupled with a fixed drive motor 32.

The rotary unit thus being driven by the motor 32 includes a filtrate collecting drum 33 whose top end is fastened at the spider 28. Between the arms of the spider 28 at the top end of the filtrate collecting drum 33 idling sprocket wheels 34 for guiding and reversing the chain travel are mounted in bearings fitted in a rail 36 extending from the top to the bottom end. At the bottom end of the filtrate collecting drum 33 driving sprocket wheels 35 are likewise mounted in bearings fitted in the rail 36.

Around the sprocket wheels 34 and 35 the brush-studded chains 16' circulate in such a manner that the downward moving portions of the chain travel of these endless chains 16' face the center axis of the centrifuge and are herein called the near-side chain travel portions for easy reference while the upward-moving chain travel portions facing the outer housing are herein called the far-side chain travel portions.

These brush-studded chains 16' are carried by self-supporting roller chains 37 made of suitable plastic material and having provision for spring clamps 15 to be linked thereto so that the strips 2 of the strip brushes 1 can swivel like in hinges for rising from their overlapped to their upstanding position.

The near-side chain travel portions of these roller chains 37 are guided along the rails 36 and the far-side chain travel portions are guided along the rails 38. The upper idling sprocket wheels 34 and the additional guide sprocket wheels 39 mounted somewhat lower are equidistant from the center axis of the centrifuge so that the near-side or downward-moving chain portions of the brush-studded chains 16 on their travel between sprocket wheels 34 and 39 form a continuous drum-shaped filter screen as shown in FIG. 12, this shape being maintained also under the influence of centrifugal force as the roller chains 37 are guided in the rails 36.

The strips 2 of the strip brushes 1 are curved to follow the contour of the circumference of the drum-shaped filter screen, as shown in FIGS. 12 and 15. The ends of the strip brushes run in grooves of sealing strips 40 arranged between the near-side chain travel portions of the brush-studded chains 16.

Since the driving sprocket wheels 35 mounted at the bottom end of the filtrate collecting drum 33 have a larger distance from the center axis of the centrifuge, the brush-studded chains 16 follow an outward-slanting portion on their further downward travel from the guide sprocket wheels 39 to the driving sprocket wheels 35 so that the edges of the strip brushes 1 on the brush-studded chains 16 are moving apart during this portion of their circulation, as shown in FIGS. 13 and 16. From this follows that at the guide sprocket wheels 39 the sealing strips 40 open up fork-like into half strips 40' so that these sealing half strips 40' guide the edges of the strip brushes 1 of the brush-studded chains 16 during their downward travel from the guide sprocket wheels 39.

For driving the sprocket wheels 35 and the disks 26 a gear transmission 41 is provided which is secured at the base plate 29 and thus rotates with the base plate 29. A center journal 42 projecting from the top end of the gear transmission 41 is secured to the fixed hollow journal 27. Projecting from the gear transmission 41 are radial shafts 43 whose speed is geared down considerably relative to the rotary speed of the housing. The shafts 43 are fitted at the inner or near-side ends with bevel gears 44 which mesh with a central bevel gear 45 in the gear transmission 41. At the outer or far-side ends of the shafts 43 are bevel gears 46 which mesh with bevel gears 47 fitted to the shafts of the driving sprocket wheels 35 so that the brush-studded chains 16' circulate continuously while the rotary unit is in motion. Within the drum-shaped filter screen area, formed by the brush-studded chains 16 during their near-side or downward travel, horizontally arranged feed disks 26 are provided one on top of another to ensure a more even distribution of the liquid to be filtered, these feed disks 26 and an inner drum 48 being firmly connected with the housing of the gear transmission 41 so that the feed disks 26 and the inner drum 48 rotate with the housing of the gear transmission 41.

The waste liquid, particle-laden or contaminated water or sewage fed into the centrifuge through the inlet 23 and passed through the tubes of the tube bundle 25 impinges on the rotating radially grooved feed disks 26 and is thus distributed and flung from the edges of the disks 26 across the small space between the slightly raised outer rims of the disks 26 and the near-side chain travel portion of the brush-studded chains 16 forming a continuous drum-shaped filter screen on which the liquid laden with impurities impinges. The liquid portion of the material to be filtered largely passes through the bristles of the brush-studded chains 16 while these are on their downward travel from the idling sprocket 34 toward the guide sprocket 39 during which portion of their travel they form a cylindrical or drum-shaped continuous filter screen.

In this range or portion of the chain travel the strip brushes 1 of the brush-studded chains 16' overlap in roofing-tile or shingle fashion and intercept the solid material and semi-solid impurities which are passed downward by the strip brushes 1 along the wall of the inner drum 48. Since this filtering process takes place while the drum is rotating, the impure liquid impinges at a high pressure upon the filter screen surface formed by the brush-studded chains 16'. The filtrate passing through the brush-studded chains runs downward along the inner wall of the filtrate collecting drum 33 and is collected at the lower edge of the drum in a channel from where the filtrate is led off through drain ducts 50, located between the bearings of the driving sprocket wheels 35, and is passed into an annular channel 51 whence the filtrate can flow off through a drain outlet 52.

While the brush-studded chains circulate around the driving sprocket wheels 35, the strip brushes 1 are caused to stand apart by a flipping motion so that the adhering deposits are released and flung against the wall of the housing 23. This flinging or centrifuging action is concomitant with the self-cleaning action of the brushes, which may be continued during the upward travel of the chain along the far-side portion of the chain travel. The deposits drop down along the wall and can be easily collected at the bottom of the housing 23 by suitable means not shown.

While the invention has been particularly shown and described with reference to preferred embodiments thereof, it will be understood by those skilled in the art that the foregoing and other changes in form and details may be made therein without departing from the spirit and scope of the invention.

What I claim is:
1. A self cleanable rotary filter comprising:
  (a) a plurality of elongated strip brushes each having relatively long bristles which bristles are secured in an elongated rigid backing,
  (b) a plurality of flexible carriers for the strip brushes, each carrier carrying a plurality of the strip brushes mounted with the elongated rigid backing of the brushes parallel to each other and spaced apart a distance less than the length of the bristles in the backing,
  (c) a pivotal attachment arrangement for pivotally attaching the backing of each brush to one of the flexible carriers with the strip brushes positioned parallel and adjacent, but slightly spaced from one another so that the bristles of adjacent strip brushes may overlap for filtering but may pivot to an upstanding position for self cleaning,
  (d) separate guide means for guiding each of the plurality of flexible carriers in a separate elongated endless path having a discharge end and a return end,
  (e) means for driving the flexible carriers in the separate endless paths and rotating the carriers about an axis as a unit, at a speed sufficient to cause the brushes to pivot to an upstanding position on one portion of the endless path for self cleaning,
  (f) support means for supporting the plurality of flexible carriers with the backing strips thereon adjacent one another so that at least a portion of the elongated endless paths of the strip brushes form a filtering surface,
  (g) rotary feed means for feeding contaminated liquid to be filtered to the inside of the surface, and
  (h) filtrate collecting means positioned outside the surface adjacent the discharge end of the endless path of the flexible carriers.

2. A filter as defined in claim 1 wherein the guide means includes at least one circular guide of small diameter relative to the length of the endless path, the circular guide positioned at the discharge end to cause the strip brushes to pivot quickly and fling off any material the brushes have collected when they form the filtering surface.

3. A filter as defined in claim 2 wherein the drive means includes a drive connection to each of the small circular guides which are wheels, and the generally vertical endless path of the flexible carriers slants outwardly from the center of the cylindrical shaped filtering surface to spread apart the flexible carriers and accommodate the drive connection.

4. A filter as defined in claim 3 wherein the guide and drive means includes a drive transmission positioned inside and below the cylindrical shaped filtering surface and the feed means includes rotary disks driven from the drive transmission.

5. A filter as defined in claim 4 wherein the brush bristles are wavy and spring clips provide a detachable pivotal attachment between the backing of each brush and the flexible carrier.

6. A filter as defined in claim 1 wherein the filter surface is substantially cylindrical and the endless path is vertical.

7. A filter as in claim 1 wherein the pivotal attachment arrangement is detachable so that each individual brush may be detached from its corresponding flexible carrier.

8. In a centrifugal filter including a number of endless belts which are arranged about an axis, each belt having filtering and return sections which are parallel to and respectively spaced nearer and farther from said axis, and drive means for moving each belt and revolving the belts as a unit about said axis; the improvement wherein each belt comprises a plurality of bristle brushes each having an elongated rigid backing with each brush backing pivotally connected to an endless flexible member trained to move in a path so that the brushes of the return section are extended radially outward by centrifugal force and are successively overlapped at the end of the return section and the overlapped brushes at the end of the filtering section are successively flipped to the extended position by centrifugal force to dislodge solids from the bristles.

References Cited
UNITED STATES PATENTS

| | | | |
|---|---|---|---|
| 1,309,651 | 7/1919 | Mulet | 210—370 |
| 1,833,315 | 11/1931 | Burhans | 210—499 |
| 2,037,840 | 4/1936 | Weston | 210—377 X |
| 2,464,440 | 3/1949 | Delius | 210—377 |
| 2,743,819 | 5/1956 | Binswanger | 210—370 X |
| 3,062,379 | 11/1962 | Bryan | 210—499 |
| 3,065,481 | 11/1962 | Peterson | 15—183 |

SAMIH N. ZAHARNA, *Primary Examiner.*